United States Patent [19]

Mikalonis

[11] Patent Number: 5,441,326
[45] Date of Patent: Aug. 15, 1995

[54] COMBINED AIR CONDITIONING DUCT, LUGGAGE COMPARTMENT AND LIGHTING FIXTURE FOR MASS TRANSIT VEHICLES

[75] Inventor: Liudas K. Mikalonis, Northville, Mich.

[73] Assignee: Transmatic, Inc., Waterford, Mich.

[21] Appl. No.: 179,525

[22] Filed: Jan. 6, 1994

Related U.S. Application Data

[63] Continuation-in-part of Ser. No. 7,578, Jan. 22, 1993, abandoned.

[51] Int. Cl.⁶ .............................................. B60Q 1/00
[52] U.S. Cl. .................................. 296/208; 296/37.7; 105/325; 362/73; 362/74
[58] Field of Search .............. 296/208, 37.7, 37.8; 105/325; 362/74, 73

[56] References Cited

U.S. PATENT DOCUMENTS

| | | | |
|---|---|---|---|
| 1,731,407 | 10/1929 | Erwin | 296/37.7 X |
| 2,250,619 | 7/1941 | Austin | 105/325 X |
| 2,251,050 | 7/1941 | Hagerty et al. | 105/325 |
| 2,284,356 | 5/1942 | Arenberg | 105/325 |
| 3,355,210 | 11/1967 | Cripe | 296/208 X |
| 3,577,903 | 5/1971 | Eggert, Jr. | 296/208 X |
| 4,387,415 | 6/1983 | Domas | 362/74 |
| 5,113,322 | 5/1992 | Mikalonis | 362/74 |

FOREIGN PATENT DOCUMENTS

| | | | |
|---|---|---|---|
| 2380916 | 9/1978 | France | 105/325 |
| 2486005 | 1/1982 | France | 105/325 |

Primary Examiner—Joseph D. Pape
Attorney, Agent, or Firm—Reising, Ethington, Barnard & Perry

[57] ABSTRACT

An air conditioning duct, luggage compartment and lighting fixture are disclosed in an integrated structure for mass transit vehicles. The air conditioning duct is formed by a panel which coacts with the upper corner of the vehicle. The panel constitutes the upper wall of a luggage compartment which has an outboard wall and bottom wall of unitary construction supported from the outboard edge of the panel. Support of the inboard edge of the bottom wall is provided by a longitudinally extending beam of channel-shape which is supported from the vehicle roof by spaced stanchions. A light fixture is disposed within the channel-shaped beam for illuminating the seating area and the aisle.

7 Claims, 5 Drawing Sheets

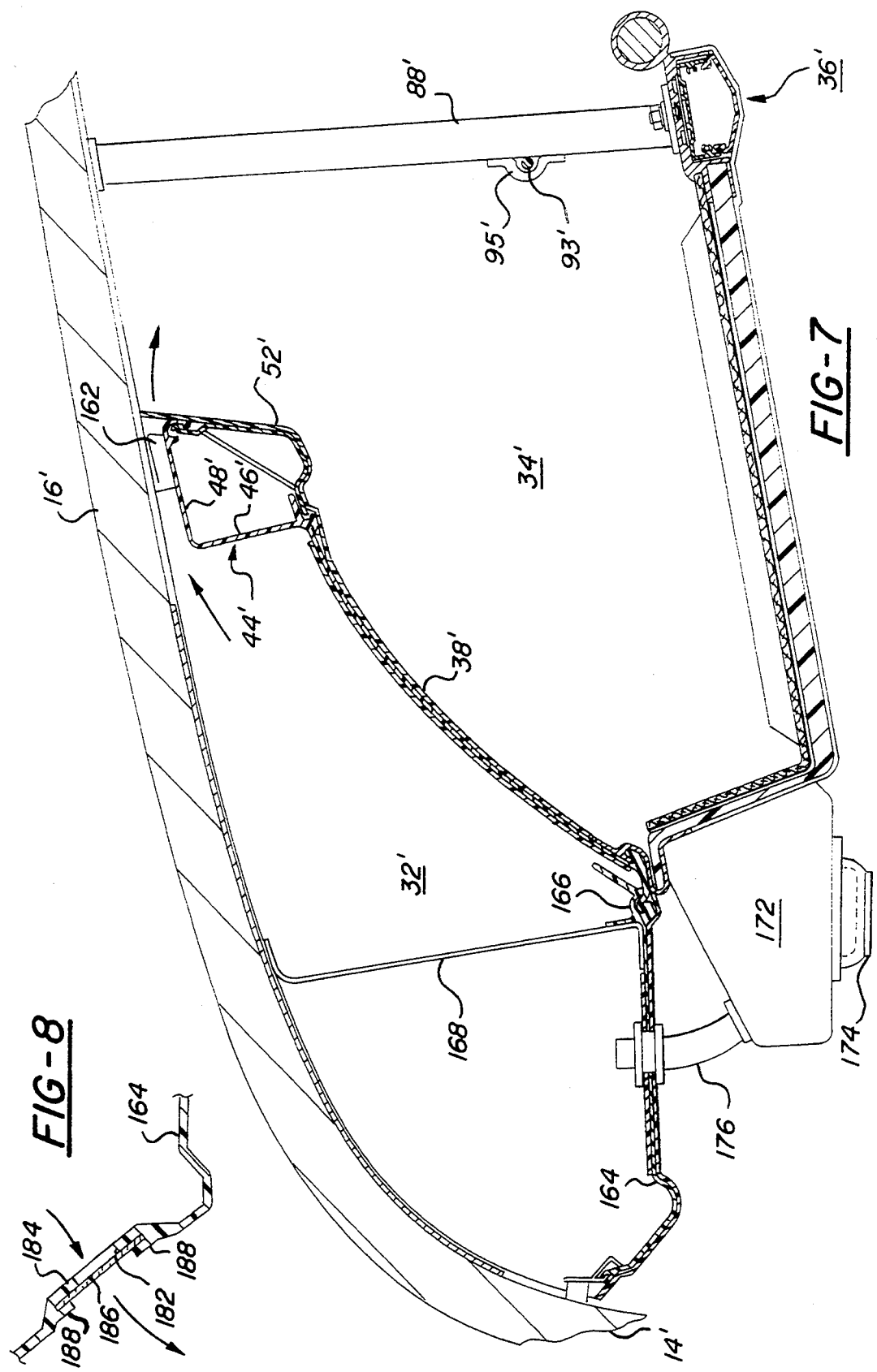

COMBINED AIR CONDITIONING DUCT, LUGGAGE COMPARTMENT AND LIGHTING FIXTURE FOR MASS TRANSIT VEHICLES

This application is a continuation in part of U.S. application Ser. No. 08/007,578, filed Jan. 22, 1993, now abandoned.

FIELD OF THE INVENTION

This invention relates to mass transit vehicles; more particularly, it relates to a combined air conditioning duct, luggage compartment and lighting fixture for the passenger compartment of such vehicles.

BACKGROUND OF THE INVENTION

For several years, it has been the practice to provide mass transit vehicles with a cornice lighting fixture of the type disclosed in Domas et al. U.S. Pat. No. 4,387,415 granted Jun. 7, 1983 which is assigned to the assignee of this invention. That cornice lighting fixture comprises an elongated panel member preferably formed by pultrusion from resin and glass fibers. The elongated panel member includes a trim panel and a light housing enclosing a fluorescent tube and disposed at the upper inboard edge of the panel. The unitary panel member is mounted in the corner of the sidewall and roof of the vehicle and coacts with the sidewall and roof to define a longitudinally extending air conditioning duct. The panel member is provided at its upper inboard edge with a lamp housing having a horizontal wall and a vertical wall which form a longitudinally extending channel adapted to receive a fluorescent tube. A removable elongated lens is disposed on the housing to distribute light from the fluorescent tube into the passenger seating area and to supply a controlled amount of light to the aisle.

A transit vehicle lighting fixture of which may be used in place of that described above is disclosed in Mikalonis U.S. Pat. No. 5,113,322 granted May 12, 1992 which is assigned to the assignee of this invention.

With changing demands in regard to mass transit, it has now become desirable to provide transit vehicles with overhead luggage compartments above the seating area on each side of the aisle for use by the individual passenger to stow their brief cases, luggage and the like. In many public transit systems, it is desired to provide such luggage racks as a retrofit on existing transit vehicles which are equipped with the prior art lighting fixtures described above. Also, in many public transit systems, it is desired to procure new transit vehicles which are to be equipped with luggage compartments in addition to air conditioning ducts and passenger compartment lighting of the type described above.

Accordingly, there is a need for a combined luggage compartment, air conditioning duct and lighting fixture which can be installed on the vehicle as original equipment or as a retrofit equipment wherein the luggage compartment is compatible with the prior art air conditioning duct and the requirements for passenger compartment lighting.

A general object of this invention is to provide a combined luggage compartment, air conditioning duct and lighting fixture for mass transit vehicles.

SUMMARY OF THE INVENTION

In accordance with this invention, an overhead luggage compartment and a lighting fixture are provided for mass transit vehicles of the type having an air conditioning duct formed by a duct panel mounted in the upper corner of the passenger compartment.

Further, in accordance with this invention, a luggage compartment is disposed between the duct and above the seating area. The luggage compartment is generally rectangular and comprises an elongated luggage rack panel having a floor and a backwall. The backwall is supported from the outboard edge of the duct panel which constitutes the top wall of the compartment. The compartment is open on the inboard side for access from the aisle. The inboard edge of the bottom wall is supported by a longitudinally extending beam which, in turn, is supported by spaced stanchions connected to the roof of the vehicle. The support beam carries a longitudinally extending lighting fixture for illuminating the seating area and the aisle.

A complete understanding of this invention may be obtained from the detailed description that follows taken with the accompanying drawings.

BRIEF DESCRIPTION OF THE DRAWINGS

FIG. 7 is a cross-sectional view of a second embodiment of this invention;

FIG. 8 shows a detail of construction; and

BEST MODE FOR CARRYING OUT THE INVENTION

Figure 1:
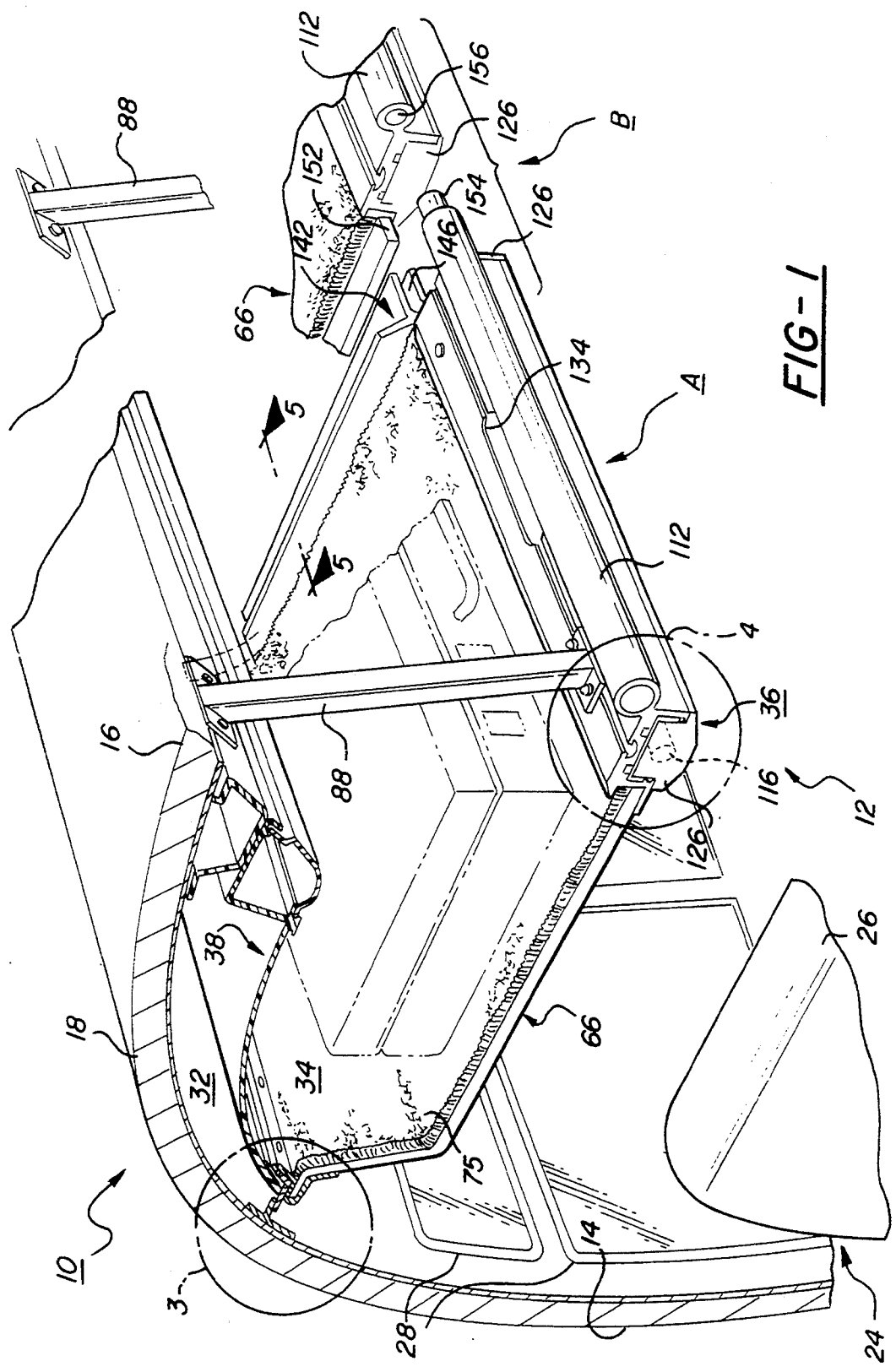
FIG. 1 is a perspective view of a first embodiment of this invention installed in a mass transit vehicle.

Referring now to the drawings, there is shown an illustrative embodiment of this invention in a combined luggage compartment, air conditioning duct and lighting fixture for use in mass transit vehicles. It will be appreciated as the description proceeds that the invention may be realized with different implementations and may be used in other applications.

The disclosures of the Domas et al. U.S. Pat. No. 4,387,415 and the Mikalonis U.S. Pat. No. 5,113,322 cited above are hereby incorporated by reference.

The first embodiment of the invention will be described with reference to FIGS. 1 through 6. As shown in FIG. 1, the invention is installed in a mass transit vehicle 10, suitably a bus. The vehicle itself is suitably of conventional construction and FIG. 1 depicts only one of the two sides of the passenger compartment 12 and depicts only a short length of the one side sufficient to show the installation of the invention. The passenger compartment 12 is enclosed by sidewall 14 and an oppositely disposed sidewall, not shown, with a roof 16 adjoining each sidewall and forming a corner 18 therewith. The passenger compartment 12 is provided with a seating area 24 extending along the sidewall 14 and with a similar seating area along the opposite sidewall, not shown. An aisle is provided in a conventional manner between the seating areas and extend along the longitudinal axis of the vehicle. The seating area includes a plurality of longitudinally spaced seats, such as seat 26, and the sidewall 14 is provided with windows 28 in a conventional manner.

Figure 2:
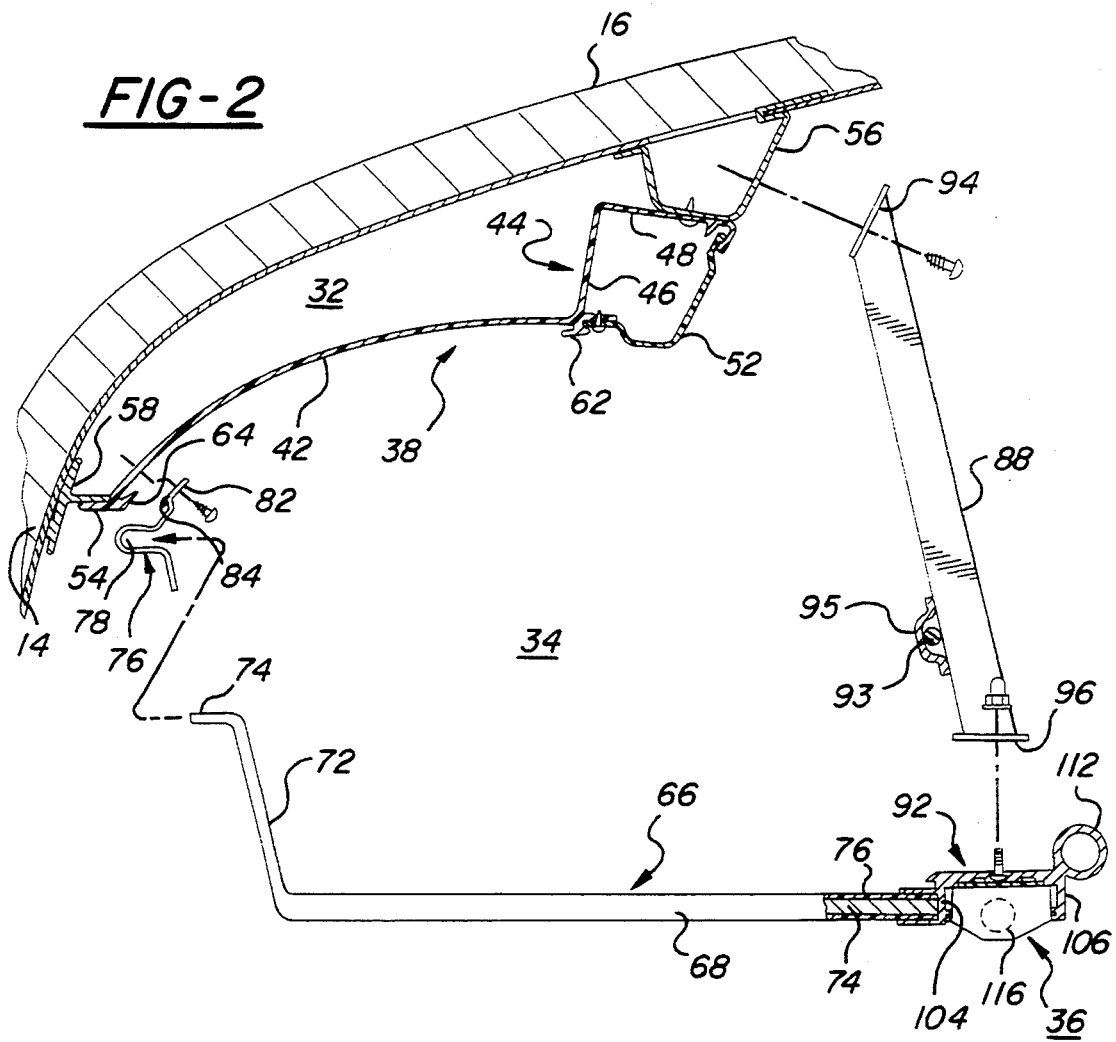
FIG. 2 is a cross-sectional view, partially exploded, showing the first embodiment of this invention installed in a mass transit vehicle.
Figure 3:
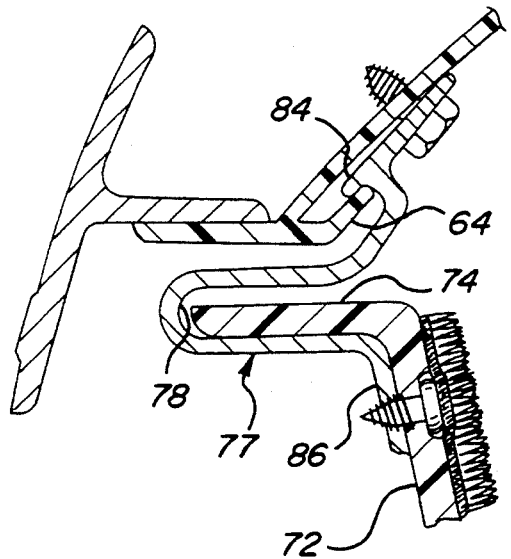
FIG. 3 shows an enlargement of the part within the circle 3 in FIG. 1.
Figure 4:
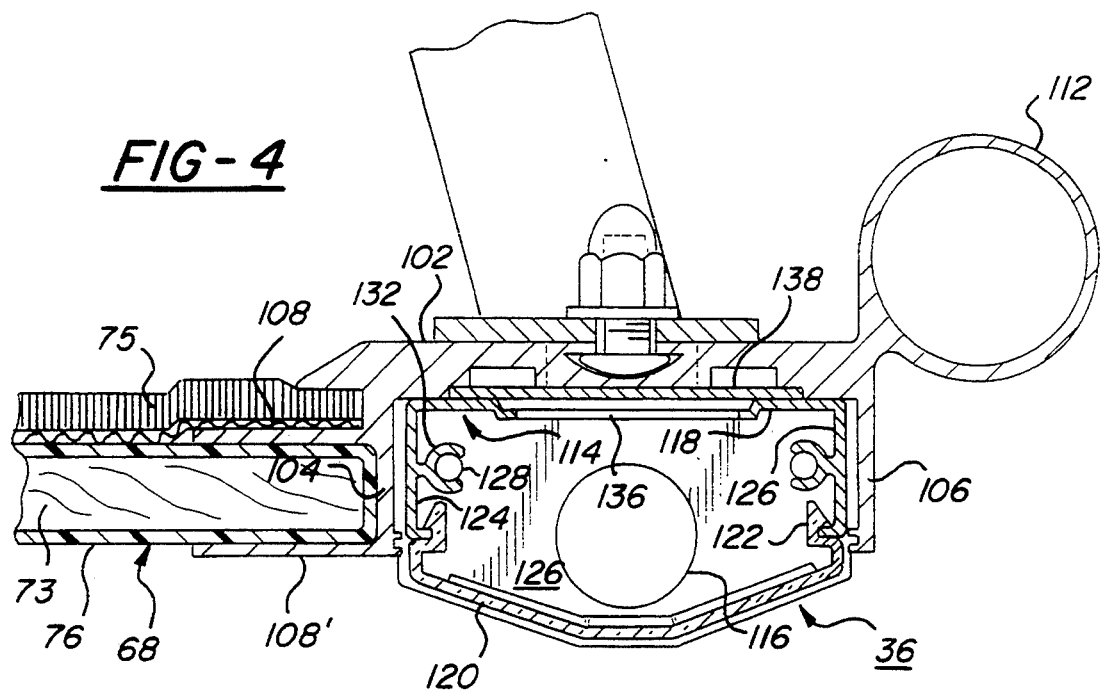
FIG. 4 is an enlargement of the part within circle 4 in FIG. 1.
Figure 5:
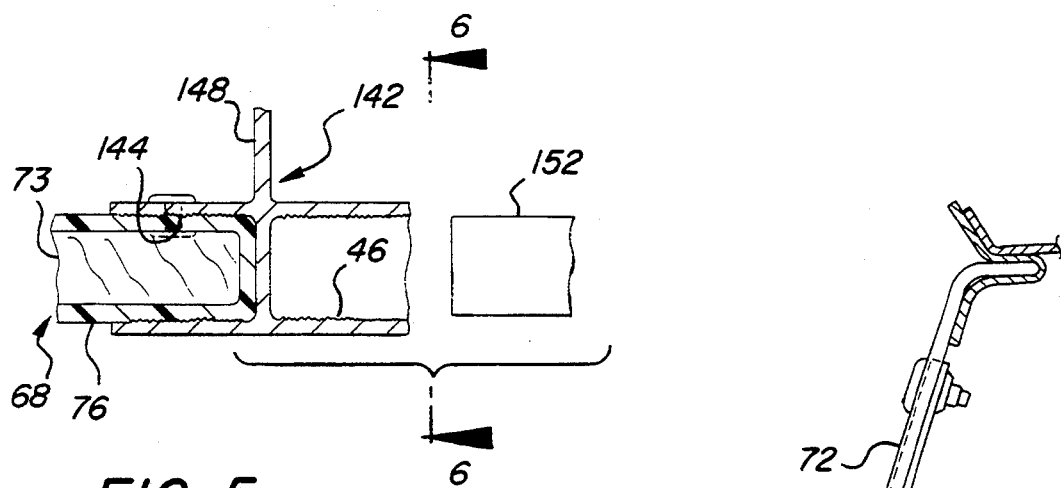
FIG. 5 is a view taken on lines 5—5 in FIG. 1 and shows a detail of construction.

The invention, as depicted in FIGS. 1 and 2, comprises a combined structure including an air conditioning duct 32, a luggage compartment 34 and a light fixture 36 which will be described in detail subsequently.

The air conditioning duct 32 will now be described. (The duct 32, per se is known in the prior art and constitutes a component of a large number of existing vehicles which may be fitted with the subject invention.) An elongated panel 38 of uniform cross-section constitutes a structural and decorative trim panel and it constitutes a wall of the duct 32. It is preferably made by pultrusion from resin which is opaque, and glass fibers. The panel 38 is mounted at its inboard and outboard edges to the roof 16 and sidewall 14, respectively, and spans at least a portion of the corner 18. The panel 38 includes a central trim section 42 which is downwardly convex. It is mounted at the upper inboard edge by an edge trim section 44 which is of channel-shape and is bounded by a vertical wall 46 and a horizontal well 48. The channel of the edge trim section 44 is closed by an elongated cover 52 which is preferably an extruded part of uniform cross-section and preferably of an opaque decorative finish. The lower outboard edge of the elongated panel 38 is provided with a horizontal flange 54 for mounting purposes. The panel 38 is mounted to the vehicle structure as follows. The inboard edge of the panel 38 is secured to a channel-shaped, elongated bracket 56 which in turn is secured to the roof 16. The outboard edge of the panel 38 is secured to an elongated T-shaped bracket 58 which in turn is secured to the sidewall 14. The panel 38 is additionally provided with upper and lower tabs 62 and 64, respectively, which are unitary with the panel 38. (In the prior art, as described in Domas et al. U.S. Pat. No. 4,387,415 cited above, the trim panel 38 just described is referred to as a cornice lighting fixture. In this, the channel-shaped edge trim section 44 is used as a light housing for a fluorescent tube and the cover 52 is in the form of a light transmitting lens. The upper and lower tabs 62 and 64 are adapted for mounting of an advertising card for viewing by the passengers. The panel 38, as used in the prior art thus constitutes a light fixture with a central trim section which can optionally hold advertising cards and it also constitutes a wall which coacts with the corner of the vehicle wall and roof to define the air conditioning duct.)

In this invention, the luggage compartment 34 has a generally rectangular cross-section which is bounded by the panel 38 as the upper wall and which is bounded by a luggage rack panel 66 which provides a bottom wall 68 and a rear or outboard wall 72. The luggage compartment is open on the inboard side and is thus accessible from the aisle. The bottom wall 68 is of laminated construction and comprises a core 73, suitably of wood, which is encased within a plastic layer 76 which is molded around the core. The outboard wall 72 is formed as a unitary part with the molded plastic layer 76 and is of solid plastic without a core. The luggage rack panel is provided with a covering of carpet 75 which is disposed over the upper surface of the bottom wall 68 and the inboard surface of the outboard wall 72.

The luggage rack panel 66 is mounted to the vehicle structure as follows. The outboard wall 72 is provided with a unitary lateral flange 74 which coacts with an elongated support bracket 77. The bracket 77 is provided with a central U-shaped channel 78 which receives the flange 74. The bracket 77 has an upper flange 82 which has downward extending lip 84 which engages the tab 64 to provide structural support for the outboard edge of the panel 38. To secure the flange 82 of the bracket 77 against displacement, screw thread fasteners may be applied at spaced intervals. The bracket 77 is also provided with a lateral flange 86 for engagement with the wall 72. The flange 74 of the outboard wall 72 is secured in place in the channel 78 by spaced screw thread fasteners.

The inboard edge of the luggage rack panel 66 is mounted to the vehicle as follows. A plurality of vertically extending bar-like stanchions 88 are connected to the vehicle structure at the roof 16 and support the inboard edge of the luggage rack panel 66 through a beam 92. Each stanchion is provided at its upper end with a flange 94 which is fastened to the elongated bracket 56 by screw thread fasteners. The lower end of the stanchion 88 is provided with a flange 96 which is connected by screw thread fasteners to the beam 92.

The beam 92 comprises a U-shaped channel opening downwardly with a horizontal base member 102 and a pair of spaced parallel flanges 104 and 106. The inboard flange 104 is provided with a pair of upper and lower flanges 108 and 108' which define an axially extending channel which receives the outboard edge of the luggage rack panel 66. The beam 92 is also provided with an axially extending tube 112 on its outboard edge which serves as a grab bar for passengers standing in the aisle. The beam is preferably formed as an extrusion of aluminum or other suitable material and is provided with a uniform cross-section along its length.

The light fixture 36 is disposed within the U-shaped channel of beam 92. The fixture comprises a channel-shaped housing 114 and a light source 116, suitably a fluorescent tube, within the housing. The housing 114 includes a base member 118 and sidewalls 122 and 124. The housing 114 is closed by a light transmitting cover or lens 120 which is elongated and extends along the length of the housing. Light from the source 116 is distributed by the lens 120 and illuminates the seating area 24 and also provides the desired illumination of the aisle. The lens 120 has a snap-in connection 122 with the housing. The housing 114 is secured in place in the beam 92 by plural screws (not shown) extending through the base member 102 of the beam into the base member 118 of the housing. An end cap 126 is attached to the housing 114 by a pair of studs 128 unitary therewith and received by respective sockets 132 on the sidewalls of the housing.

The light fixture 36 also provides illumination for the luggage compartment 34. For this purpose, the base member 102 of the beam 92 is provided with a plurality of elongated openings 134 which are suitably spaced along the length of the beam. Also, the base member 118 of the housing 114 is provided with openings 136 which are of the same configuration and in alignment with the openings 134. A transparent cover 138 is disposed over the aligned openings 134 and 136, suitably between the base members 118 and 102 for transmission of light into the luggage compartment.

Figure 6:
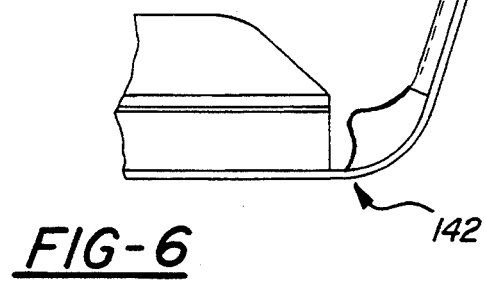
FIG. 6 is a view taken on lines 6—6 of FIG. 5.

As illustrated in FIG. 1, the luggage compartment 34 and the light fixtures 36 are constructed as modular sections. FIG. 1 shows only two adjoining sections namely sections A and B each of which may be several feet in length. FIG. 1 shows the sections A and B in exploded view such that the adjoining ends are separated for the purpose of showing the manner in which the two sections may be connected together. In general, the luggage rack panels are connected by tongue and groove joints and the tubular grab bars 112 are telescopically connected. The light fixtures have their respective housings butted together end-to-end. For greater detail, reference is made to FIGS. 5 and 6 which show the tongue and groove joints. The luggage rack panel 66 is provided on its right hand end with a coupling member 142 which extends from the inboard edge of the panel 66 to the outboard edge and is provided with a sideways H-shaped cross-section which defines horizontal grooves 144 and 146. The coupling member 142 is fixedly attached to the right hand end of panel 66 and is held in place by suitable fasteners. The coupling member 142 is provided with an upstanding rib 148 which serves as a strengthening member and also as a stop member to prevent sliding of brief cases etc. from one section to the next. The left hand end of the luggage rack panel 66 is provided with a tongue 152 which is coextensive with the groove 146 and aligned therewith. The adjacent panel sections are joined by insertion of the tongue 152 into the groove 146. At the same time, the telescopic fitting 154 on the right hand end of the tubular grab bar 112 is inserted into the socket 156 on the left hand end of the adjoining grab bar 112. As shown in FIG. 6, the coupling member 142 has a flat extension strap 158 which extends around the back of the outboard wall 72 of the adjoining panels 66 and is secured to each of the panels by a suitable fastener.

The second embodiment of the invention is shown in FIG. 7. In this embodiment, the air conditioning duct 32' is of larger cross-section and the luggage compartment 34' and the light fixture 36' are moved inboard toward the aisle. The air conditioning duct 32' utilizes a panel 38' of the same structure as the panel 38 of the first embodiment as shown in FIGS. 1 and 2. (In describing this second embodiment, those parts which are the same as or similar to corresponding parts in FIGS. 1 and 2 will be designated with the same reference number combined with a prime symbol.) The horizontal wall 48' of the edge trim member 44' is connected to the roof 16' through a plurality of standoff members 162 which are spaced apart to allow air flow from the duct 32' to the passenger compartment. A horizontal panel 164 has an inboard edge interlocked by a tongue and groove connection 166 with the outboard edge of the panel 38' and has its outboard edge connected to the vehicle sidewall 14 by a grooved clip which receives a tongue on the edge of panel 164. Plural support brackets 168 (one shown) are longitudinally spaced and each is fastened at its lower end with the panel 164 and at its upper end with the vehicle roof. Thus, the air conditioning duct 32' is bounded by panels 38' and 164 and the corner of the vehicle between the sidewall 14' and the roof 16'.

The luggage compartment 34' is of the same construction as the luggage compartment 34 of the first embodiment as shown in FIGS. 1 and 2. Likewise, the lighting fixture 36' is of the same construction as the fixture 36 of FIGS. 1 and 2.

The second embodiment as shown in FIG. 7 is provided with a reading lamp fixture 172 (only one shown) which extends axially over the seating area to provide an individual lamp 174 for each seat. The lamps 174 are connected to an electrical cable 176 which extends through the air conditioning duct 132'.

FIG. 8 shows an air conditioning outlet which may be utilized with the embodiment of FIG. 7. The air conditioning outlet of FIG. 8 comprises a longitudinally extending channel formation 182 which runs along the length of the panel 164. The bottom of the channel formation 182 is provided with spaced openings 184 (only one shown) with such an opening over each pair of passenger seats. Each opening may be opened or closed by a slide plate 186 which is retained in the channel formation by a pair of opposed ledges 188 on opposite sides of the channel formation.

Figure 9:
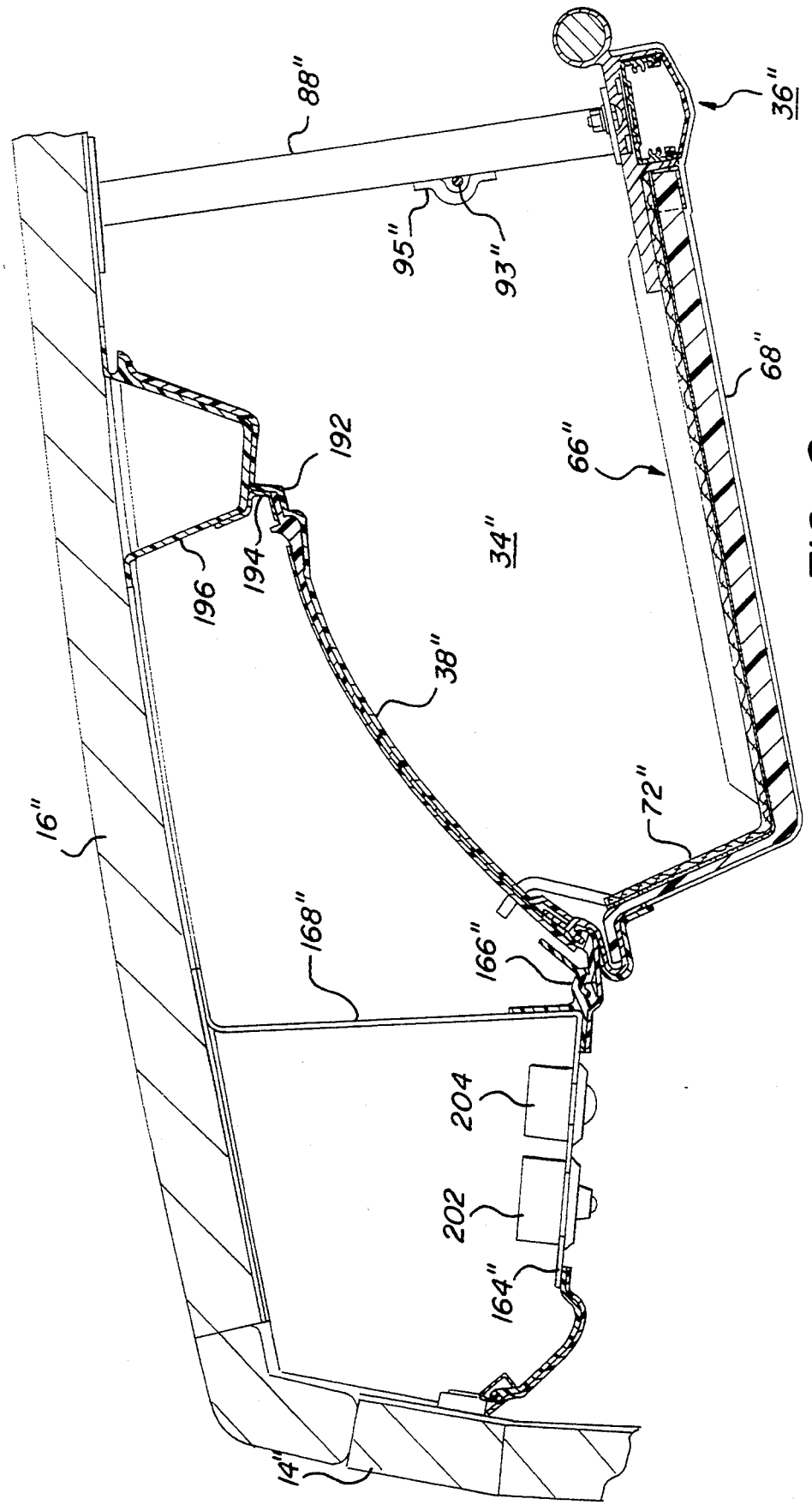
FIG. 9 shows a cross-sectional view of a third embodiment of this invention.

A third embodiment of the invention is shown in FIG. 9. This embodiment is the same as the embodiment of FIG. 7 with two exceptions. (In this embodiment, those parts which are the same as corresponding parts in the embodiment of FIG. 7 will be designated with the same reference numerals with a double prime symbol instead of the single prime symbol.) The first exception is the construction of the panel 38". It differs from the panel 38' by the absence of the edge trim section 44' which as shown in FIG. 7 includes vertical wall 46' and horizontal wall 48' and also by the absence of the cover 52'. Instead of having the edge trim section 44'. A flange 192 at the edge of the panel 38" is connected by a connector strip 194 with a bracket 196 which in turn is mounted to the roof 16" of the vehicle. The second exception is that individual reading lamps 202 and 204 for outboard and inboard seats are mounted directly on the panel 164".

Although the description of this invention has been given with reference to a particular embodiment it is not to be construed in a limiting sense. Many variations and modifications will now occur to those skilled in the art. For a definition of the invention, reference is made to the appended claims.

What is claimed is:

1. A mass transit vehicle comprising a passenger area with an aisle extending along the longitudinal axis of the vehicle and a seating area on either side of the aisle, said passenger area being enclosed by oppositely disposed sidewalls and a roof adjoining each sidewall and forming a corner therewith, an elongated air conditioning duct extending along said axis above the seating area on one side of the aisle for supplying air thereto, said duct being defined by an elongated panel means having an inboard edge joined to said roof and an outboard edge joined to one sidewall and spanning the corner formed by the one sidewall and the roof, a light fixture disposed above said seating area including an elongated support beam and light housing extending along said axis, said light fixture being supported by plural vertically disposed stanchions each being joined at its lower end with said support beam and joined at its upper end to said roof, and a luggage compartment disposed below said duct and above said seating area, said luggage compartment extending along said axis and comprising an elongated luggage rack panel having a floor and an outboard backwall connected with said floor, said outboard backwall being supported by said one sidewall, said floor being supported by said fixture whereby access to said luggage compartment from said aisle is provided by open space above said light fixture and spacing between said stanchions, said light housing being adapted to receive a light source and including a lower lens for distributing light from said source into said seating area and said aisle, said light housing also including an upper lens for distributing light from said source into said luggage compartment.

2. A mass transit vehicle as defined in claim 1 wherein:
said outboard backwall is supported by said air conditioning duct.

3. A mass transit vehicle as defined in claim 1 wherein:
a longitudinally extending grab bar is unitary with said support beam and is disposed on the inboard edge of said beam.

4. A mass transit vehicle as defined in claim 3 wherein:
said support beam and said luggage compartment are constructed of modular longitudinally extending sections which adjoin each other in end-to-end relation by a coupling on the luggage rack panel and by a telescopic joint on said grab bar.

5. A mass transit vehicle as defined in claim 4 wherein:
said coupling on the luggage rack panel comprises a coupling attached to one end of the floor of one section, said coupling being H-shaped in cross-section and a first longitudinally extending channel which receives said one end of the floor of said one section and a second longitudinally extending channel adapted to receive the end of the floor of an adjoining section,
said grab bar of each section terminating at said one end of said one section in a telescopic fitting which is adapted to receive a complementary telescopic fitting on the end of the grab bar of said adjoining section.

6. A mass transit vehicle as defined in claim 1 wherein:
said support beam has a channel-shaped cross-section with said channel opening downwardly, said light housing being disposed within said channel whereby said light housing may extend from one modular section to an adjoining modular section in said channel.

7. A mass transit vehicle as defined in claim 6 wherein:
said support beam has an opening in registry with said upper lens.

* * * * *